(12) United States Patent
Takeda et al.

(10) Patent No.: US 12,037,511 B2
(45) Date of Patent: Jul. 16, 2024

(54) COATING COMPOSITION FOR ELECTRICAL STEEL SHEET, SURFACE-COATED ELECTRICAL STEEL SHEET FOR ADHESION AND LAMINATED CORE

(71) Applicant: NIPPON STEEL CORPORATION, Tokyo (JP)

(72) Inventors: Kazutoshi Takeda, Tokyo (JP); Ichiro Tanaka, Tokyo (JP); Minako Fukuchi, Tokyo (JP); Shinsuke Takatani, Tokyo (JP); Shuichi Yamazaki, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 17/923,531

(22) PCT Filed: Jun. 17, 2021

(86) PCT No.: PCT/JP2021/023038
§ 371 (c)(1),
(2) Date: Nov. 4, 2022

(87) PCT Pub. No.: WO2021/256535
PCT Pub. Date: Dec. 23, 2021

(65) Prior Publication Data
US 2023/0183518 A1   Jun. 15, 2023

(30) Foreign Application Priority Data
Jun. 17, 2020   (JP) .................................. 2020-104244

(51) Int. Cl.
| C09D 163/00 | (2006.01) |
| C09D 7/40 | (2018.01) |
| C09D 7/61 | (2018.01) |

(52) U.S. Cl.
CPC ............. *C09D 163/00* (2013.01); *C09D 7/61* (2018.01); *C09D 7/66* (2018.01)

(58) Field of Classification Search
None
See application file for complete search history.

(56) References Cited

U.S. PATENT DOCUMENTS

| 2007/0087201 A1 | 4/2007 | Wimmer et al. |
| 2016/0375658 A1 | 12/2016 | Kim et al. |
| 2018/0122573 A1 | 5/2018 | Fluch et al. |
| 2019/0160786 A1 | 5/2019 | Nakagawa et al. |
| 2019/0367746 A1 | 12/2019 | Takeda et al. |
| 2020/0102454 A1* | 4/2020 | Kang .................. C08L 101/00 |

FOREIGN PATENT DOCUMENTS

| CN | 1383446 A | 12/2002 |
| EP | 3 902 106 A1 | 10/2021 |
| JP | S52-37934 A | 3/1977 |
| JP | 2006-351409 A | 12/2006 |
| JP | 2008-518087 A | 5/2008 |
| JP | 2016-540901 A | 12/2016 |
| JP | 2018-518591 A | 7/2018 |
| KR | 10-2019-0022846 A | 3/2019 |
| KR | 10-2019-0097246 A | 8/2019 |
| TW | 201932303 A | 8/2019 |
| WO | WO 2006/049935 A1 | 5/2006 |
| WO | WO 2010/148821 A1 | 12/2010 |

* cited by examiner

*Primary Examiner* — Robert T Butcher
(74) *Attorney, Agent, or Firm* — Birch, Stewart, Kolasch & Birch, LLP

(57) ABSTRACT

This coating composition for an electrical steel sheet is a coating composition for an electrical steel sheet containing an epoxy resin, a high-temperature curing agent, and inorganic fine particles, wherein a content of the high-temperature curing agent with respect to 100 parts by mass of the epoxy resin is 5 to 30 parts by mass, wherein the inorganic fine particles are one or more selected from metal hydroxides, metal oxides that react with water at 25° C. to become metal hydroxides and silicate minerals having a hydroxyl group, wherein the volume average particle diameter of the inorganic fine particles is 0.05 to 2.0 μm, wherein a content of the epoxy resin with respect to a total mass of the coating composition for an electrical steel sheet is 45 mass % or more, and wherein a content of the inorganic fine particles with respect to 100 parts by mass of the epoxy resin is 1 to 100 parts by mass.

13 Claims, 6 Drawing Sheets

COATING COMPOSITION FOR ELECTRICAL STEEL SHEET, SURFACE-COATED ELECTRICAL STEEL SHEET FOR ADHESION AND LAMINATED CORE

TECHNICAL FIELD

The present invention relates to a coating composition for an electrical steel sheet, a surface-coated electrical steel sheet for adhesion and a laminated core. Priority is claimed on Japanese Patent Application No. 2020-104244, filed Jun. 17, 2020, the content of which is incorporated herein by reference.

BACKGROUND ART

Generally, when laminated cores are assembled for motors and transformers using an electrical steel sheet, unit iron cores are obtained by shearing or punching, and then laminated and fixed by bolt tightening, fastening, welding or adhesion to form a laminated core. In recent years, there has been demand for further improvement in motor efficiency, and further reduction in core loss has been required. In order to reduce the core loss, reducing the thickness of the electrical steel sheet is effective. However, when the electrical steel sheet is thin, not only is it difficult to caulk or weld, but the laminate end surface is also easily opened, and it is difficult to maintain the shape of the laminated core.

In order to address such problems, instead of integrating electrical steel sheets by fastening or welding, a technique in which an electrical steel sheet having an adhesive insulation coating formed on the surface is thermocompressed to form a laminated core has been proposed. For example, Patent Document 1 proposes a coating composition for an electrical steel sheet containing an epoxy resin, a curing agent and nanoparticles having a specific average radius. Patent Document 2 proposes a coating composition for an electrical steel sheet containing a water-soluble epoxy resin, inorganic nanoparticles and an inorganic additive. Patent Document 3 proposes an electrical steel sheet in which a thermosetting enamel layer containing an epoxy resin, a curing agent and a filler is provided on one flat surface.

CITATION LIST

Patent Document

[Patent Document 1]
Published Japanese Translation No. 2008-518087 of the PCT International Publication
[Patent Document 2]
Published Japanese Translation No. 2016-540901 of the PCT International Publication
[Patent Document 3]
Published Japanese Translation No. 2018-518591 of the PCT International Publication

SUMMARY OF THE INVENTION

Problems to be Solved by the Invention

In the technologies of Patent Documents 1 to 3, it is attempted to improve the bond strength of the insulation coating, the corrosion resistance, the electrical insulation, the quality of the surface of the electrical steel sheet, and the stability of the shape of the laminated core.

However, improvement in productivity when the laminated core is molded is not considered.

The present invention has been made in view of the above circumstances, and an object of the present invention is to provide a coating composition for an electrical steel sheet which can improve the productivity of a laminated core, a surface-coated electrical steel sheet for adhesion and a laminated core.

Means for Solving the Problem

In order to address the above problems, the present invention proposes the following aspects.

[1] A coating composition for an electrical steel sheet, the coating composition containing: an epoxy resin, a high-temperature curing agent, and inorganic fine particles,
wherein a content of the high-temperature curing agent with respect to 100 parts by mass of the epoxy resin is 5 to 30 parts by mass,
wherein the inorganic fine particles are one or more selected from metal hydroxides, metal oxides that react with water at 25° C. to become metal hydroxides, and silicate minerals having a hydroxyl group,
wherein a volume average particle diameter of the inorganic fine particles is 0.05 to 2.0 µm,
wherein a content of the epoxy resin with respect to a total mass of the coating composition for an electrical steel sheet is 45 mass % or more, and
wherein a content of the inorganic fine particles with respect to 100 parts by mass of the epoxy resin is 1 to 100 parts by mass.

[2] The coating composition for an electrical steel sheet according to [1],
wherein the inorganic fine particles are one or more selected from aluminum hydroxide, calcium hydroxide, magnesium hydroxide, calcium oxide, magnesium oxide, talc, mica and kaolin.

[3] The coating composition for an electrical steel sheet according to [1] or [2],
wherein the high-temperature curing agent is one or more selected from aromatic amines, phenolic curing agents and dicyandiamides.

[4] A surface-coated electrical steel sheet for adhesion having an insulation coating obtained by applying the coating composition for an electrical steel sheet according to any one of [1] to [3] on the surface.

[5] A laminated core obtained by laminating two or more surface-coated electrical steel sheets for adhesion according to [4].

Effects of the Invention

According to the coating composition for an electrical steel sheet of the present invention, it is possible to improve the productivity of the laminated core.

EMBODIMENT(S) FOR IMPLEMENTING THE INVENTION

Hereinafter, a laminated core (laminated core) according to one embodiment of the present invention, an electric motor including the laminated core, and a material forming the laminated core will be described with reference to the drawings. Here, in the present embodiment, as an electric motor, an electric motor, specifically, an AC electric motor, more specifically, a synchronous electric motor, and still more specifically, a permanent magnet field type electric motor will be described as an example. This type of electric motor is suitably used for, for example, an electric automobile.

Figure 1:
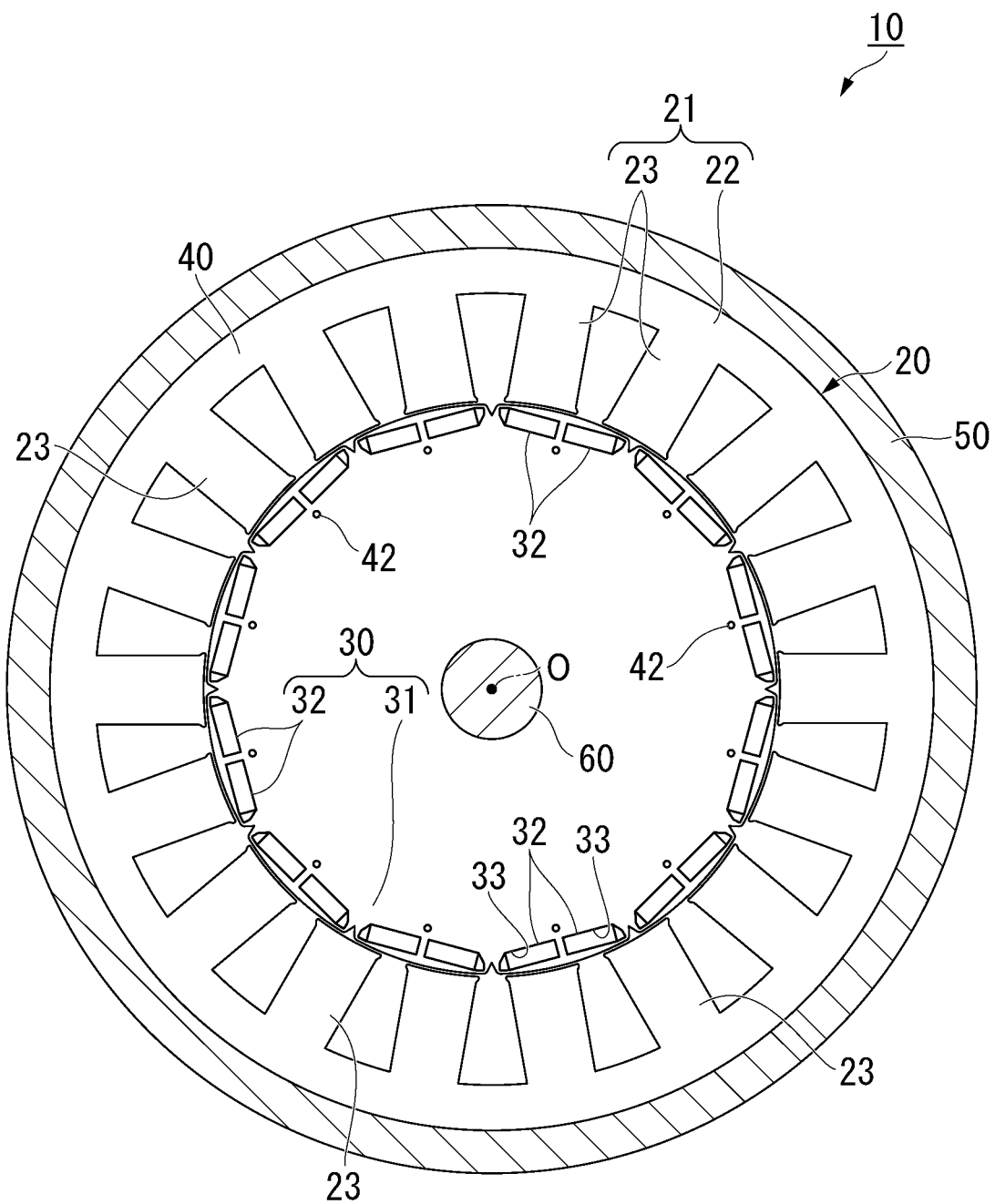
FIG. 1 is a cross-sectional view of an electric motor including a laminated core according to one embodiment of the present invention.

As shown in FIG. 1, an electric motor 10 includes a stator 20, a rotor 30, a case 50, and a rotating shaft 60. The stator 20 and the rotor 30 are accommodated in the case 50. The stator 20 is fixed into the case 50.

In the present embodiment, as the electric motor 10, an inner rotor type machine in which the rotor 30 is positioned inside the stator 20 in the radial direction is used. However, as the electric motor 10, an outer rotor type machine in which the rotor 30 is positioned outside the stator 20 may be used. In addition, in the present embodiment, the electric motor 10 is a 12-pole and 18-slot three-phase AC motor. However, the number of poles, the number of slots, the number of phases and the like can be appropriately changed.

The electric motor 10 can rotate at a rotational speed of 1,000 rpm by applying, for example, an excitation current having an effective value of 10 A and a frequency of 100 Hz to each phase.

The stator 20 includes an adhesive laminated core for a stator (hereinafter referred to as a stator core) 21 and a winding (not shown).

The stator core 21 includes a circular core back part 22 and a plurality of teeth parts 23. In the following, the center axis O direction of the stator core 21 (or the core back part 22) will be referred to as an axial direction, the radial direction (direction orthogonal to the center axis O) of the stator core 21 (or the core back part 22) will be referred to as a radial direction, and the circumferential direction (direction around the center axis O) of the stator core 21 (or the core back part 22) will be referred to as a circumferential direction.

The core back part 22 is formed in an annular shape in a plan view of the stator 20 when viewed from the axial direction. The plurality of teeth parts 23 protrudes from the inner peripheral of the core back part 22 in a radially inward direction (toward the center axis O of the core back part 22 in the radial direction). The plurality of teeth parts 23 are arranged at equal angular intervals in the circumferential direction. In the present embodiment, 18 teeth parts 23 are provided at every 20 degrees in central angles centered on the center axis O. The plurality of teeth parts 23 are formed so that they have the same shape and the same size. Therefore, the plurality of teeth parts 23 have the same thickness size.

The winding is wound around the teeth parts 23. The winding may be concentrated winding or distributed winding.

The rotor 30 is arranged inside the stator 20 (the stator core 21) in the radial direction. The rotor 30 includes a rotor core 31 and a plurality of permanent magnets 32.

The rotor core 31 is formed in a circular (annular) shape and arranged coaxially with the stator 20. The rotating shaft 60 is arranged in the rotor core 31. The rotating shaft 60 is fixed to the rotor core 31.

The plurality of permanent magnets 32 are fixed to the rotor core 31. In the present embodiment, a pair of permanent magnets 32 form one magnetic pole. The plurality of sets of permanent magnets 32 are arranged at equal angular intervals in the circumferential direction. In the present embodiment, 12 sets (24 in total) of permanent magnets 32 are provided at every 30 degrees in central angles centered on the center axis O.

In the present embodiment, an embedded magnet type motor is used as the permanent magnet field type electric motor. In the rotor core 31, a plurality of through-holes 33 that penetrate the rotor core 31 in the axial direction are formed. The plurality of through-holes 33 are provided to correspond to the arrangement of the plurality of permanent magnets 32. The permanent magnets 32 that are arranged in the corresponding through-holes 33 are fixed to the rotor core 31. Fixing of each permanent magnet 32 to the rotor core 31 can be realized by, for example, adhering the outer surface of the permanent magnet 32 and the inner surface of the through-hole 33 with an adhesive. Here, as the permanent magnet field type electric motor, a surface magnet type motor may be used in place of the embedded magnet type.

Figure 2:
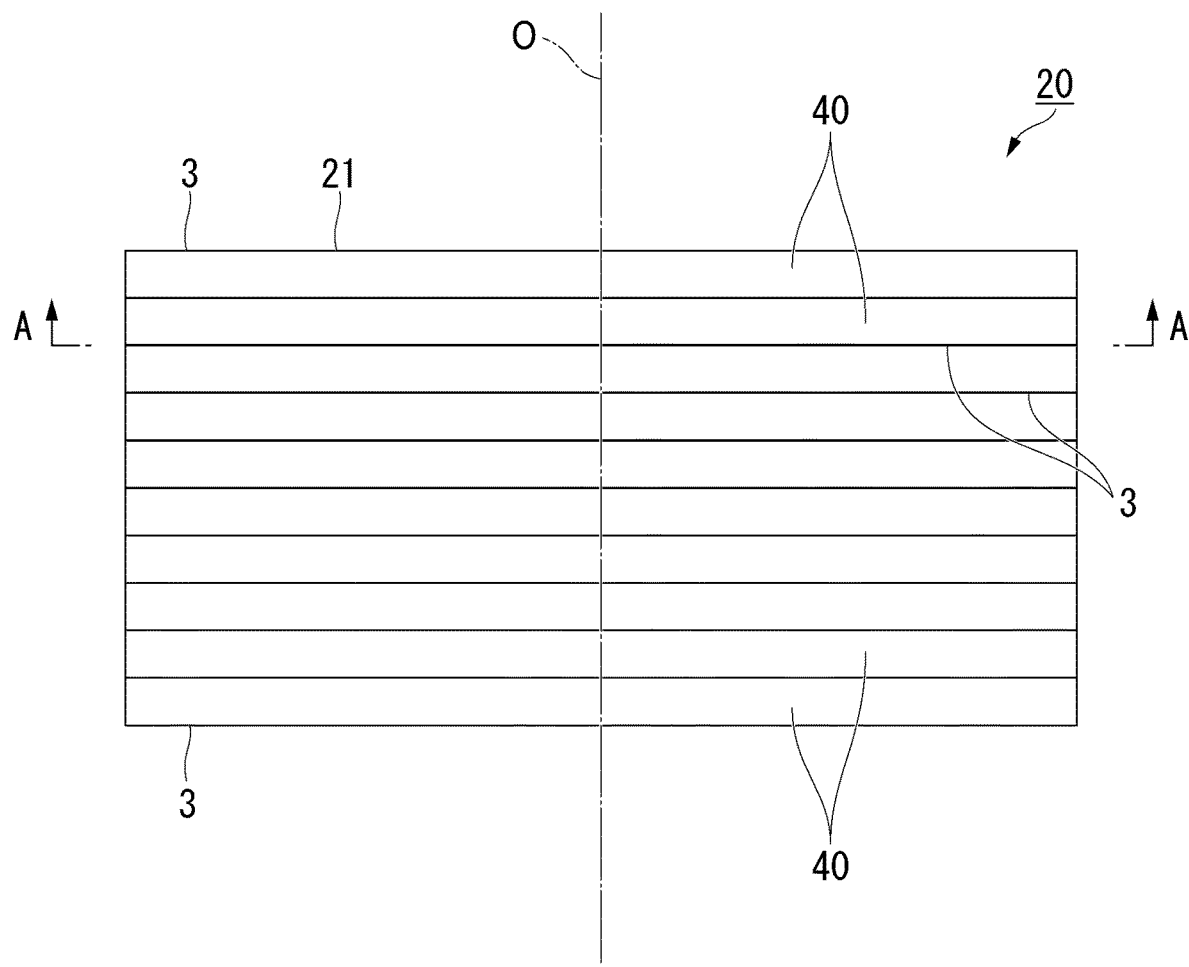
FIG. 2 is a side view of the laminated core shown in FIG. 1.

Both the stator core 21 and the rotor core 31 are laminated cores. For example, as shown in FIG. 2, the stator core 21 is formed by laminating a plurality of electrical steel sheets (surface-coated electrical steel sheet for adhesion) 40 in the axial direction.

Here, the lamination thickness (total length along the center axis O) of each of the stator core 21 and the rotor core 31 is, for example, 50.0 mm. The outer diameter of the stator core 21 is, for example, 250.0 mm. The inner diameter of the stator core 21 is, for example, 165.0 mm. The outer diameter of the rotor core 31 is, for example, 163.0 mm. The inner diameter of the rotor core 31 is, for example, 30.0 mm. However, these values are examples, and the lamination thickness, the outer diameter and the inner diameter of the stator core 21, and the lamination thickness, the outer diameter and the inner diameter of the rotor core 31 are not limited to these values. Here, the inner diameter of the stator core 21 is based on the tip part of the teeth part 23 in the stator core 21. That is, the inner diameter of the stator core 21 is the diameter of an imaginary circle inscribed in the tip parts of all the teeth parts 23.

Figure 4:
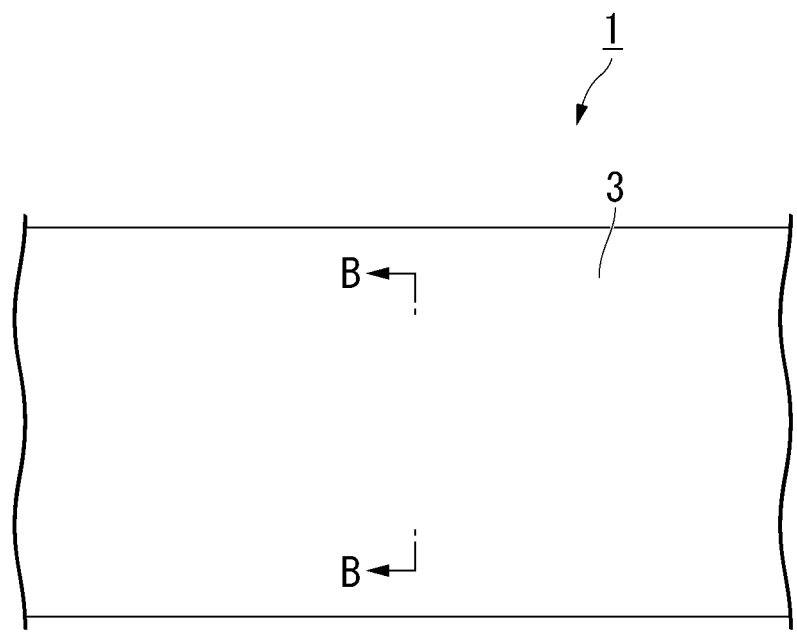
FIG. 4 is a plan view of a material forming the laminated core shown in FIG. 1.
Figure 5:
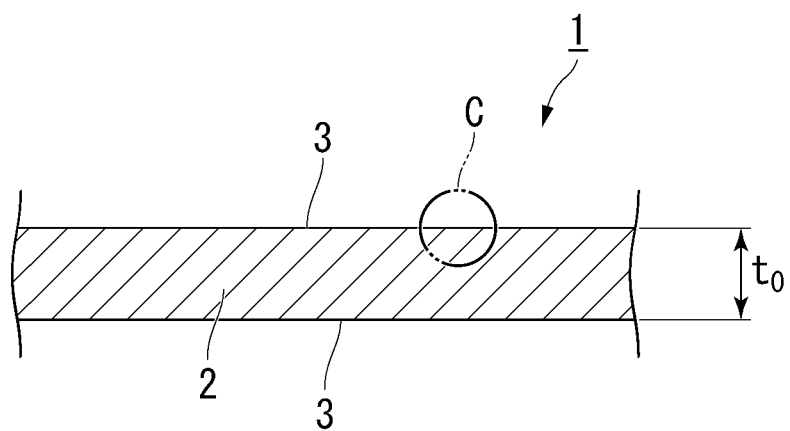
FIG. 5 is a cross-sectional view taken along the line B-B in FIG. 4.
Figure 6:
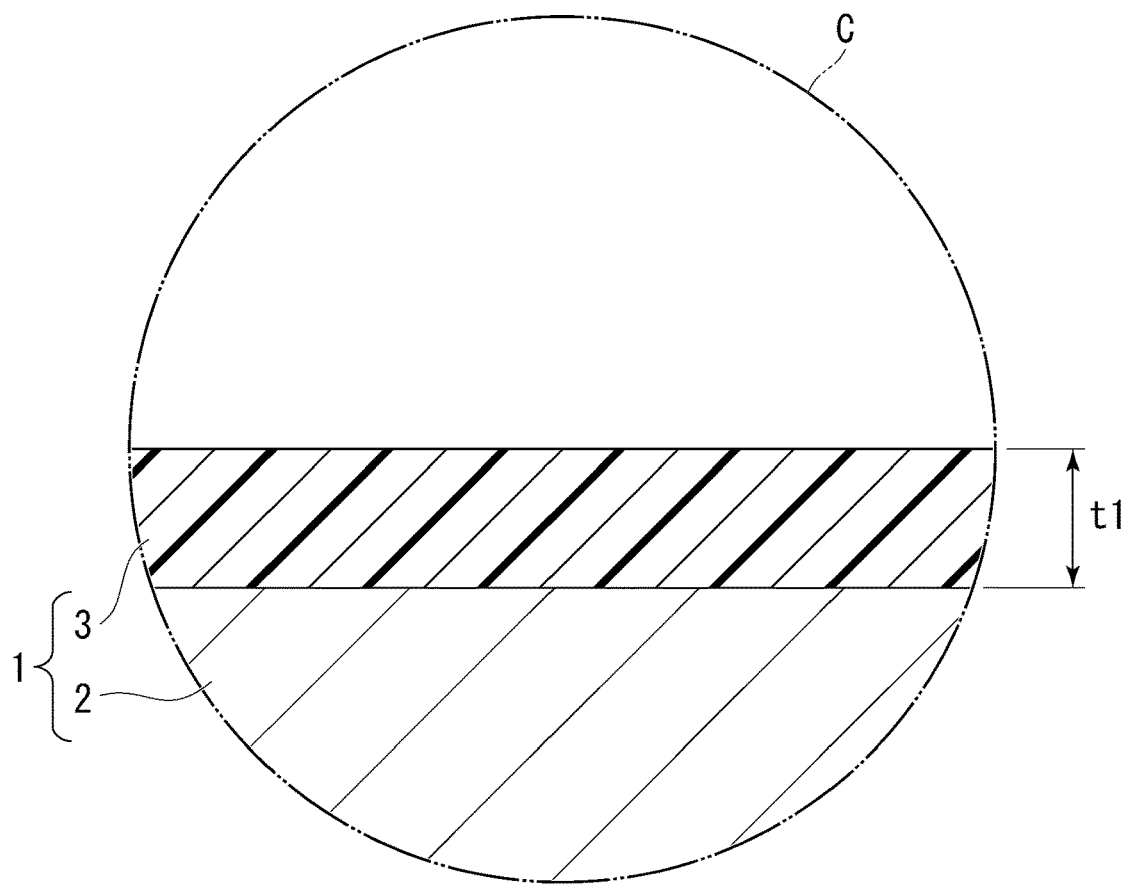
FIG. 6 is an enlarged view of a part C in FIG. 5.

Each electrical steel sheet 40 forming the stator core 21 and the rotor core 31 is formed, for example, by punching a material 1 as shown in FIG. 4 to FIG. 6. The material 1 is a steel sheet (electrical steel sheet) that is a base of the electrical steel sheet 40. As the material 1, for example, a strip-shaped steel sheet and a cut sheet may be exemplified.

Although description of the laminated core is in progress, the material 1 will be described below. Here, in this specification, the strip-shaped steel sheet that is a base of the electrical steel sheet 40 may be referred to as the material 1. A steel sheet having a shape used for a laminated core obtained by punching the material 1 may be referred to as the electrical steel sheet 40.

For example, the material 1 that is wound around a coil 1A is handled. In the present embodiment, a non-oriented electrical steel sheet is used as the material 1. As the non-oriented electrical steel sheet, a non-oriented electrical steel strip according to JIS C 2552: 2014 can be used. However, as the material 1, a grain-oriented electrical steel sheet may be used in place of the non-oriented electrical steel sheet. As the grain-oriented electrical steel sheet in this case, a grain-oriented electrical steel strip according to JIS C 2553: 2019 can be used. In addition, a non-oriented thin electrical steel strip or a grain-oriented thin electrical steel strip according to JIS C 2558: 2015 can be used.

The upper and lower limit values of an average sheet thickness t0 of the material 1 are set, for example, as follows, in consideration of a case in which the material 1 is used for the electrical steel sheet 40.

As the material 1 becomes thinner, the production cost of the material 1 increases. Therefore, in consideration of the production cost, the lower limit value of the average sheet thickness t0 of the material 1 is 0.10 mm, preferably 0.15 mm, and more preferably 0.18 mm.

On the other hand, when the material 1 is too thick, the production cost is favorable, but when the material 1 is used for the electrical steel sheet 40, the eddy current loss increases and the core loss deteriorates. Therefore, in consideration of the core loss and the production cost, the upper limit value of the average sheet thickness t0 of the material 1 is 0.65 mm, preferably 0.35 mm, and more preferably 0.30 mm.

0.20 mm may be exemplified as a value that satisfies the above range of the average sheet thickness t0 of the material 1.

Here, the average sheet thickness t0 of the material 1 includes not only the thickness of a base steel sheet 2 to be described below but also the thickness of an insulation coating 3. In addition, a method of measuring the average sheet thickness t0 of the material 1 is, for example, the following measurement method. For example, when the material 1 is wound into the shape of the coil 1A, at least part of the material 1 is unwound into a flat sheet shape. In the material 1 unwound into a flat sheet shape, a predetermined position (for example, a position separated from the edge of the material 1 in the longitudinal direction by 10% of the total length of the material 1) on the material 1 in the longitudinal direction is selected. At the selected position, the material 1 is divided into five areas in the width direction thereof. At four locations that are boundaries of these five areas, the sheet thickness of the material 1 is measured. The average value of the sheet thicknesses at four locations can be set as the average sheet thickness t0 of the material 1.

The upper and lower limit values of the average sheet thickness t0 of the material 1 can be naturally used as the upper and lower limit values of the average sheet thickness t0 of the electrical steel sheet 40. Here, a method of measuring the average sheet thickness t0 of the electrical steel sheet 40 is, for example, the following measurement method. For example, the lamination thickness of the laminated core is measured at four locations (that is, every 90 degrees around the center axis O) at equal intervals in the circumferential direction. Each of the measured lamination thicknesses at four locations is divided by the number of laminated electrical steel sheets 40 to calculate the sheet thickness per sheet. The average value of the sheet thicknesses at four locations can be set as the average sheet thickness t0 of the electrical steel sheet 40.

As shown in FIG. 5 and FIG. 6, the material 1 includes the base steel sheet 2 and the insulation coating 3. In the material 1, both surfaces of the strip-shaped base steel sheet 2 are covered with the insulation coating 3. In the present embodiment, most of the material 1 is formed with the base steel sheet 2, and the insulation coating 3 thinner than the base steel sheet 2 is laminated on the surface of the base steel sheet 2.

The chemical composition of the base steel sheet 2 includes 2.5% to 4.5% of Si in mass %, as shown below in units of mass %. Here, when the chemical composition is within the above range, the yield strength of the material 1 (the electrical steel sheet 40) can be set to, for example, 380 MPa or more and 540 MPa or less.

Si: 2.5% to 4.5%
Al: 0.001% to 3.0%
Mn: 0.05% to 5.0%
The remainder: Fe and impurities When the material 1 is used for the electrical steel sheet 40, the insulation coating 3 exhibits insulation performance between the electrical steel sheets 40 adjacent to each other in the axial direction. In addition, in the present embodiment, the insulation coating 3 has an adhesive ability, and adheres the electrical steel sheets 40 adjacent to each other in the axial direction. The insulation coating 3 may have a single-layer structure or a multi-layer structure. More specifically, for example, the insulation coating 3 may have a single-layer structure having both insulation performance and an adhesive ability, or may have a multi-layer structure including a underlying insulation coating having excellent insulation performance and a top insulation coating having excellent adhesive performance. Here, having an adhesive ability means having an adhesive strength of a predetermined value or more under a predetermined temperature condition.

In the present embodiment, the insulation coating 3 entirely covers both the surfaces of the base steel sheet 2 without gaps. However, as long as the above insulation performance and adhesive ability are secured, the insulation coating 3 does not have to cover both surfaces of the base steel sheet 2 without gaps. In other words, the insulation coating 3 may be provided intermittently on the surface of the base steel sheet 2. For example, when the insulation coating 3 has a multi-layer structure including a underlying insulation coating having excellent insulation performance and a top insulation coating having excellent adhesive performance, even if the underlying insulation coating is formed over the entire surface of the base steel sheet without gaps and the top insulation coating is intermittently provided, it is possible to achieve both the insulation performance and the adhesive ability.

The coating composition forming the underlying insulation coating is not particularly limited, and for example, a general treatment agent such as a chromic acid-containing treatment agent or a phosphate-containing treatment agent can be used.

The insulation coating having an adhesive ability is formed by applying a coating composition for an electrical steel sheet to be described above onto a base steel sheet. The insulation coating having an adhesive ability is, for example, an insulation coating having a single-layer structure having both insulation performance and an adhesive ability or a top insulation coating provided on a underlying insulation coating. The insulation coating having an adhesive ability is in an uncured state or a semi-cured state (B stage) before heating and pressurizing when a laminated core is produced, a curing reaction proceeds by heating during heating and pressurizing and an adhesive ability is exhibited.

The coating composition for an electrical steel sheet of the present invention contains an epoxy resin, a high-temperature curing agent, and inorganic fine particles.

As the epoxy resin, any epoxy resin having two or more epoxy groups in one molecule can be used without particular limitation. Examples of such epoxy resins include bisphenol A type epoxy resins, bisphenol F type epoxy resins, triphenylmethane type epoxy resins, phenol novolak type epoxy resins, cresol novorak type epoxy resins, alicyclic epoxy resins, glycidyl ester type epoxy resins, glycidylamine type epoxy resins, hydantoin type epoxy resins, isocyanurate type epoxy resins, acrylic acid-modified epoxy resins (epoxy acrylate), phosphorus-containing epoxy resins, and halides thereof (brominated epoxy resins, etc.), hydrogen additives and the like. These epoxy resins may be used alone or two or more thereof may be used in combination.

The content of the epoxy resin with respect to a total mass of the coating composition for an electrical steel sheet is 45 mass % or mom. The content of the epoxy resin with respect to a total mass of the coating composition for an electrical steel sheet is preferably 45 mass % to 90 mass %, more preferably 50 to 80 mass %, and still more preferably 50 to 70 mass %. When the content of the epoxy resin is equal to or larger than the lower limit value, the adhesive strength of the electrical steel sheet 40 is further improved. When the content of the epoxy resin is equal to or less than the upper limit value, it is possible to further relax the stress strain of the electrical steel sheet 40.

The high-temperature curing agent may cross-link the epoxy resin. Here, the high-temperature curing agent is a crosslinking agent in which the curing reaction does not proceed at room temperature (for example, 20° C. to 30° C.) and the curing temperature (reaction temperature) is 100° C. or higher.

The curing temperature of the mixture containing an epoxy resin and a high-temperature curing agent is preferably 150° C. or higher. On the other hand, the upper limit of the curing temperature is not particularly limited. However, when the curing temperature is higher than 200° C., curing during coating and baking is insufficient, which makes it impossible to wind the coil and which may hinder the production of the laminated core. Therefore, the curing temperature is preferably 200° C. or lower.

Here, the "curing temperature" is a temperature at which the viscoelasticity measured by a rigid pendulum type physical property testing machine decreases as curing proceeds. When a cross-linked structure is exhibited as the curing reaction proceeds, the movement of the pendulum is restricted, and the swing cycle of the pendulum rapidly decreases. Therefore, the curing temperature can be determined based on the change in the swing cycle of the pendulum.

Examples of high-temperature curing agent s include aromatic amines, phenolic curing agents, acid anhydride-based curing agents, dicyandiamides, and blocked isocyanates. When a high-temperature curing agent is applied, excessive curing of the resin in the baking process can be minimized. Thus, when the obtained surface-coated electrical steel sheets for adhesion are laminated, heated and pressurized to produce a laminated core, since the curing reaction can further proceed, the adhesive strength at a high temperature is further improved.

Examples of aromatic amines include m-xylylenediamine, m-phenylenediamine, diaminodiphenylmethane, and diaminodiphenyl sulfone.

Examples of phenolic curing agents include phenol novolak resins, cresol novolak resins, bisphenol novolak resins, triazine-modified phenol novolak resins, phenol resol resins, and cresol naphthol formaldehyde condensates.

Examples of acid anhydride-based curing agents include phtalic anhydride, hexahydrophthalic anhydride, methyltetrahydrophthalic anhydride, methylhexahydrophthalic anhydride, methylnadic anhydride, chlorendic anhydride, pyromellitic anhydride, benzophenone tetracarboxylic acid anhydride, ethylene glycol bis(anhydrotrimate), methylcyclohexenetetracarboxylic acid anhydride, trimellitic anhydride, and polyazelaic anhydride.

Dicyandiamide is also known as a latent curing agent. The latent curing agent can be mixed with an epoxy resin and stably stored at room temperature, and has an ability to rapidly cure the resin composition by heat, light, pressure or the like. Dicyandiamide is a colorless orthorhombic crystal or sheet crystal having a melting point of 207 to 210° C. It reacts with an epoxy resin at 160 to 180° C. and is cured for 20 to 60 minutes.

Dicyandiamide is preferably used in combination with a curing accelerator. Examples of curing accelerators include tertiary amines, imidazoles, and aromatic amines.

The blocked isocyanate is a compound that inhibits the reaction by masking an isocyanate group of a polyisocyanate with a blocking agent. Examples of raw materials of polyisocyanates include diphenylmethane diisocyanate (MDI), hexamethylene diisocyanate (HDI), toluene diisocyanate (TDI), and isophorone diisocyanate (IPDI). Examples of blocking agents include alcohols and phenols.

In order to further improve the productivity of the laminated core, as the high-temperature curing agent, one or more selected from aromatic amines, phenolic curing agents and dicyandiamides are preferable, and one or more selected from m-xylylenediamine, m-phenylenediamine, diaminodiphenylmethane, phenol novolak resins, cresol novolak resins, phenol resol resins and dicyandiamide are more preferable.

The high-temperature curing agent s may be used alone or two or more thereof may be used in combination.

The content of the high-temperature curing agent with respect to 100 parts by mass of the epoxy resin is 5 to 30 parts by mass, preferably 10 to 30 parts by mass, and more preferably 15 to 25 parts by mass. When the content of the high-temperature curing agent is equal to or larger than the lower limit value, the productivity of the laminated core is further improved. When the content of the high-temperature curing agent is equal to or less than the upper limit value, the adhesive strength of the laminated core is further improved.

The inorganic fine particles are one or more selected from metal hydroxides, metal oxides that react with water at 25° C. to become metal hydroxides, and silicate minerals having a hydroxyl group. The inorganic fine particles of the present embodiment contain hydroxyl groups. When hydroxyl groups are provided, they activate the high-temperature curing agent, and effectively promote curing by cross-linking of the epoxy resin. As a result, compared with the case in which the inorganic fine particles of the present embodiment are not contained, the time required for adhering electrical steel sheets to each other can be shortened and it is possible to improve the productivity of the laminated core.

The inorganic fine particles may be used alone or two or more thereof may be used in combination.

Examples of metal hydroxides include aluminum hydroxide, calcium hydroxide, magnesium hydroxide, manganese hydroxide, iron(II) hydroxide, and zinc hydroxide. Among the metal hydroxides, aluminum hydroxide, calcium hydroxide, and magnesium hydroxide are particularly preferable because they activate the high-temperature curing agent and have a strong effect of promoting curing of the epoxy resin.

The metal hydroxides may be used alone or two or more thereof may be used in combination.

Examples of metal oxides that react with water at 25° C. (room temperature) to become metal hydroxides include calcium oxide and magnesium oxide.

The metal oxides that react with water at 25° C. to become metal hydroxides may be used alone or two or more thereof may be used in combination.

Examples of silicate minerals having a hydroxyl group include talc, mica, kaolin (kaolinite), montmorillonite, chlorite, and glauconite. Among the silicate minerals having a hydroxyl group, talc, mica, and kaolin are particularly preferable because they activate the high-temperature curing agent and have a strong effect of promoting curing of the epoxy resin.

The silicate minerals having a hydroxyl group may be used alone or two or more thereof may be used in combination.

The content of the inorganic fine particles with respect to 100 parts by mass of the epoxy resin is 1 to 100 parts by mass, preferably 5 to 70 parts by mass, and more preferably 10 to 50 parts by mass. When the content of the inorganic fine particles is equal to or larger than the lower limit value, the productivity of the laminated core is further improved. When the content of the inorganic fine particles is equal to or less than the upper limit value, the adhesive strength of the laminated core is further improved.

The volume average particle diameter of the inorganic fine particles is 0.05 to 2.0 µm, preferably 0.05 to 1.5 µm, and more preferably 0.05 to 1.0 µm. The volume average particle diameter of the inorganic fine particles is still more preferably less than 0.2 µm. When the volume average particle diameter of the inorganic fine particles is equal to or less than the upper limit value, hydroxyl groups contained in the inorganic fine particles can be dispersed more uniformly. It is difficult to obtain inorganic fine particles having a volume average particle diameter smaller than 0.05 µm at low cost.

The volume average particle diameter of the inorganic fine particles is a numerical value (d50) defined by a particle diameter corresponding to a cumulative frequency of 50% based on volume in a distribution curve of equivalent spherical diameters obtained by a laser diffraction method according to ISO13320 and JIS Z 8825: 2013.

The coating composition for an electrical steel sheet of the present embodiment may contain a component (hereinafter referred to as an "optional component") other than the epoxy resin, the high-temperature curing agent, and the inorganic fine particles.

Examples of optional components include a curing accelerator (curing catalyst), an anti-foaming agent, and a surfactant, which do not correspond to the above high-temperature curing agent.

Examples of anti-foaming agents include silicone oil.

Examples of surfactants include alkyl polyglucosides.

The coating composition for an electrical steel sheet of the present embodiment may contain a silicone resin. When a silicone resin is contained, the content of the silicone resin with respect to a total mass of the coating composition for an electrical steel sheet is preferably 40 mass % or less. Here, the silicone resin is a resin having a siloxane (Si—O—Si) bond. The content of the silicone resin is more preferably 30 mass % or less, still more preferably 20 mass % or less, and particularly preferably 10 mass % or less. Since it is not necessary to contain a silicone resin, the lower limit is 0 mass %.

When the coating composition for an electrical steel sheet of the present embodiment contains an optional component, the content of the optional component with respect to 100 parts by mass of the epoxy resin is preferably 0.1 to 5 parts by mass.

The coating composition for an electrical steel sheet of the present embodiment is applied to the electrical steel sheet and then dried to obtain the insulation coating 3. When the coating composition for an electrical steel sheet of the present embodiment is applied to the electrical steel sheet, baking and applying (baking process) are preferable.

The end-point temperature in the baking process is, for example, preferably 120 to 220° C., more preferably 130 to 210° C., and still more preferably 140 to 200° C. When the end-point temperature is equal to or larger than the lower limit value, the coating composition for an electrical steel sheet is sufficiently adhered to the electrical steel sheet, and peeling off is restricted. When the end-point temperature is equal to or less than the upper limit value, curing of the epoxy resin can be minimized and it is possible to maintain the adhesive ability of the coating composition for an electrical steel sheet.

The baking time in the baking process is for example, preferably 5 to 60 seconds, more preferably 10 to 30 seconds, and still more preferably 10 to 20 seconds. When the baking time is equal to or larger than the lower limit value, the coating composition for an electrical steel sheet is sufficiently adhered to the electrical steel sheet, and peeling off is restricted. When the baking time is equal to or less than the upper limit value, curing of the epoxy resin can be minimized and it is possible to maintain the adhesive ability of the coating composition for an electrical steel sheet.

The upper and lower limit values of an average thickness t1 of the insulation coating 3 are set, for example, as follows, in consideration of a case in which the material 1 is used for the electrical steel sheet 40.

When the material 1 is used for the electrical steel sheet 40, in order to secure the insulation performance between the electrical steel sheets 40 laminated with each other, the average thickness t1 of the insulation coating 3 (the thickness per one surface of the electrical steel sheet 40 (the material 1)) is adjusted so that the insulation performance and adhesive ability between the electrical steel sheets 40 laminated with each other can be secured.

In the case of the insulation coating 3 having a single-layer structure, the average thickness t1 of the insulation coating 3 (the thickness per one surface of the electrical steel sheet 40 (the material 1)) may be, for example, 1.5 µm or more and 8.0 µm or less.

In the case of the insulation coating 3 having a multi-layer structure, the average thickness of the underlying insulation coating may be, for example, 0.1 µm or more and 2.0 µm or less, and is preferably 0.3 µm or more and 1.5 µm or less. The average thickness of the top insulation coating may be, for example, 1.5 µm or more and 8.0 µm or less.

Here, a method of measuring the average thickness t1 of the insulation coating 3 in the material 1 is the same as that of the average sheet thickness t0 of the material 1, and the average thickness can be determined by obtaining the thickness of the insulation coating 3 at a plurality of locations and averaging these thicknesses. The thickness of the insulation coating 3 is determined, for example, by observing a cross section of the material 1 cut in the thickness direction under a scanning electron microscope (SEM).

The upper and lower limit values of the average thickness t1 of the insulation coating 3 in the material 1 can be naturally used as the upper and lower limit values of the average thickness t1 of the insulation coating 3 in the electrical steel sheet 40. Here, a method of measuring the average thickness t1 of the insulation coating 3 in the electrical steel sheet 40 is, for example, the following measurement method. For example, among the plurality of electrical steel sheets forming the laminated core, the electrical steel sheet 40 positioned on the outmost side in the axial direction (the electrical steel sheet 40 whose surface is exposed in the axial direction) is selected. On the surface of the selected electrical steel sheet 40, a predetermined position in the radial direction (for example, a position exactly at the middle (center) between the inner peripheral edge and the outer peripheral edge of the electrical steel sheet 40) is selected. At the selected position, the thickness of the insulation coating 3 of the electrical steel sheet 40 is measured at four locations (that is, every 90 degrees around the center axis O) at equal intervals in the circumferential direction. The average value of the measured thicknesses at four locations can be set as the average thickness t1 of the insulation coating 3.

Here, the reason why the average thickness t1 of the insulation coating 3 is measured on the electrical steel sheet 40 positioned on the outmost side in the axial direction in this manner is that the insulation coating 3 is formed so that the thickness of the insulation coating 3 hardly changes at the lamination position in the axial direction of the electrical steel sheet 40.

The electrical steel sheet 40 is produced by punching the material 1 as described above, and the laminated core (the stator core 21 and the rotor core 31) is produced using the electrical steel sheet 40.

Figure 3:
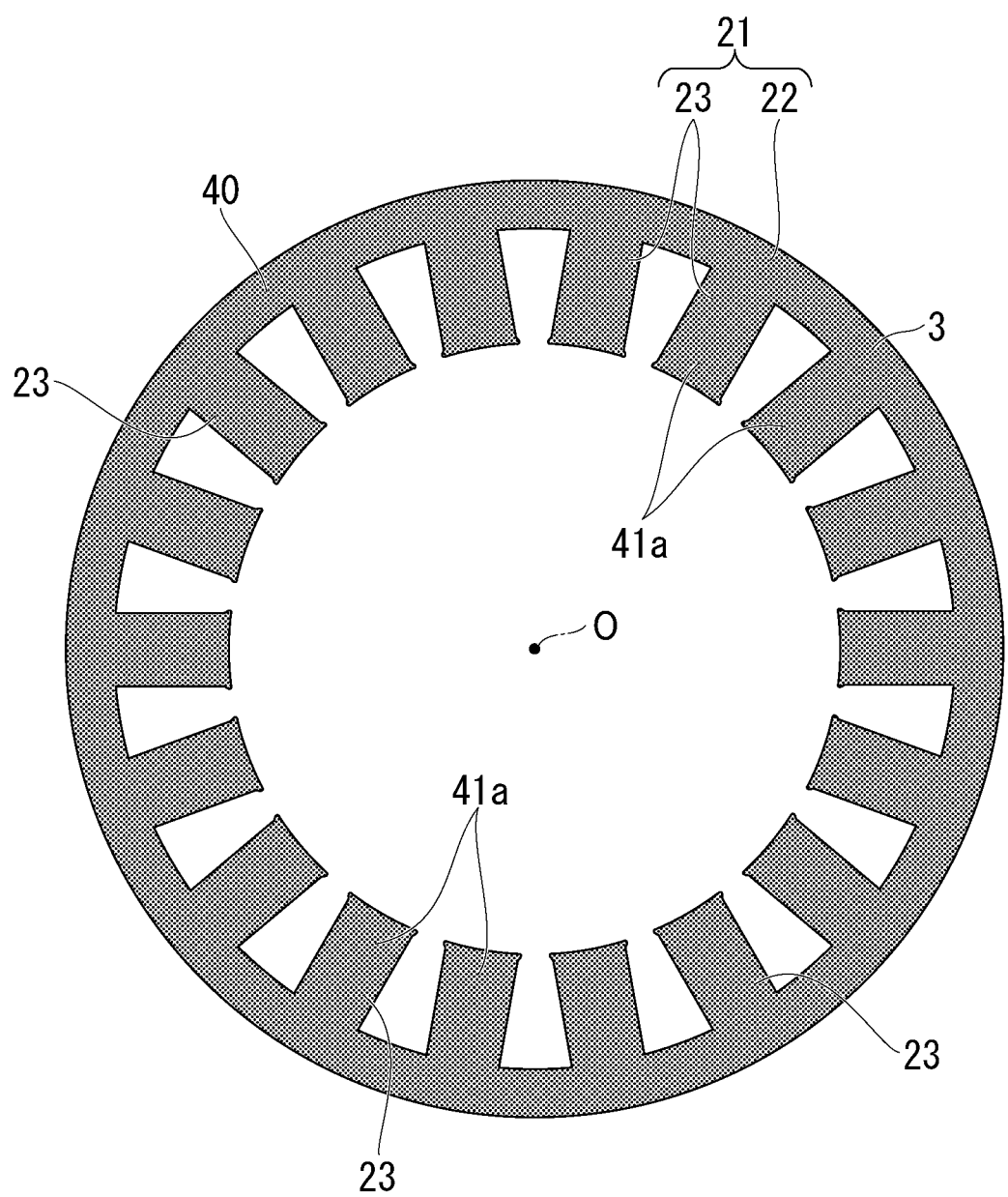
FIG. 3 is a cross-sectional view taken along the line A-A in FIG. 2.

Hereinafter, description will return to the laminated core. As shown in FIG. 3, the plurality of electrical steel sheets 40 forming the stator core 21 are laminated via the insulation coating 3.

The electrical steel sheets 40 adjacent to each other in the axial direction are adhered over the entire surface with the insulation coating 3. In other words, a surface of the electrical steel sheet 40 (hereinafter referred to as a first surface) facing the axial direction is an adhesive area 41a over the entire surface. However, the electrical steel sheets 40 adjacent to each other in the axial direction may not be adhered over the entire surface. In other words, on the first surface of the electrical steel sheet 40, the adhesive area 41a and the non-adhesive area (not shown) may be mixed.

In the present embodiment, the plurality of electrical steel sheets forming the rotor core 31 are fixed to each other by a fastening 42 (joggle) shown in FIG. 1. However, the plurality of electrical steel sheets forming the rotor core 31 may also have a laminate structure fixed by the insulation coating 3 as in the stator core 21.

In addition, the laminated core such as the stator core 21 and the rotor core 31 may be formed by so-called rotating stacking.

Figure 7:
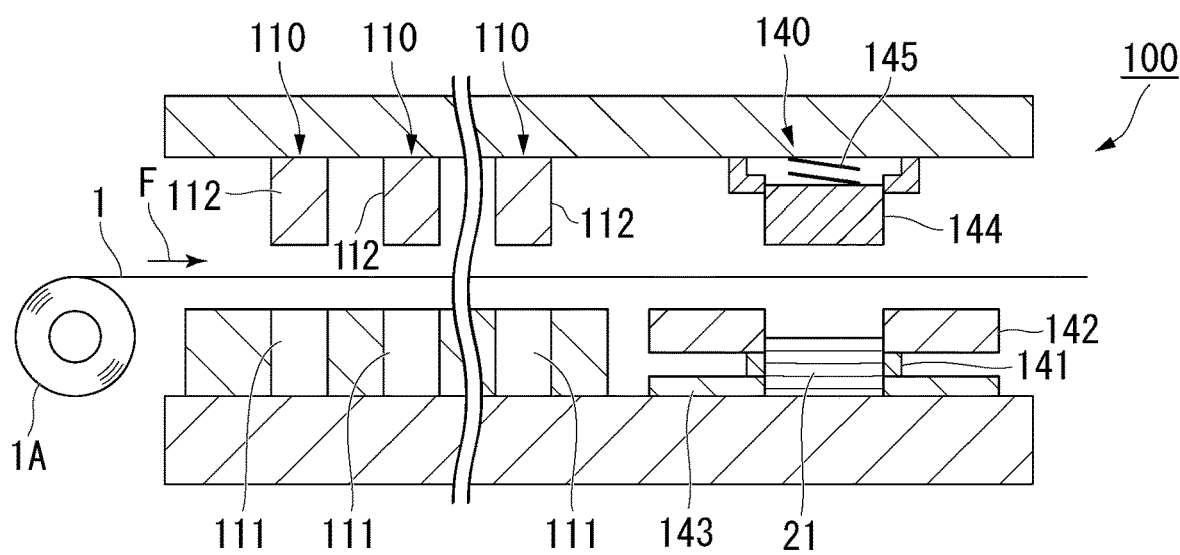
FIG. 7 is a side view of a production device used for producing the laminated core shown in FIG. 1.

The stator core 21 is produced, for example, using a production device 100 shown in FIG. 7. Hereinafter, in description of the production method, first, the laminated core production device 100 (hereinafter simply referred to as the production device 100) will be described.

In the production device 100, while the material 1 is sent out from the coil 1A (hoop) in the arrow F direction, it is punched a plurality of times using molds arranged on stages, and gradually formed into the shape of the electrical steel sheet 40. Then, the punched electrical steel sheets 40 are laminated and pressurized while raising the temperature. As a result, the electrical steel sheets 40 adjacent to each other in the axial direction are adhered to each other with the insulation coating 3 (that is, a part of the insulation coating 3 positioned in the adhesive area 41a is caused to exhibit an adhesive ability), and the adhesion is completed.

As shown in FIG. 7, the production device 100 includes a plurality of stages of punching stations 110. The punching station 110 may have two stages or three or more stages. The punching station 110 of each stage includes a female mold 111 arranged below the material 1 and a male mold 112 arranged above the material 1.

The production device 100 further includes a lamination station 140 at a position downstream from the most downstream punching station 110. The lamination station 140 includes a heating device 141, an outer peripheral punching female mold 142, a heat insulation member 143, an outer peripheral punching male mold 144, and a spring 145.

The heating device 141, the outer peripheral punching female mold 142, and the heat insulation member 143 are arranged below the material 1. On the other hand, the outer peripheral punching male mold 144 and the spring 145 are arranged above the material 1. Here, reference numeral 21 indicates a stator core.

In the production device 100 having the configuration described above, first, the material 1 is sequentially sent out from the coil 1A in the arrow F direction in FIG. 7. Then, the material 1 is sequentially punched on the plurality of stages of punching stations 110. According to these punching procedures, in the material 1, the shape of the electrical steel sheet 40 having the core back part 22 and the plurality of teeth parts 23 shown in FIG. 3 is obtained. However, since the material is not completely punched at this time, it proceeds to the next process in the arrow F direction.

Then, finally, the material 1 is sent out to the lamination station 140, punched out by the outer peripheral punching male mold 144, and laminated with high accuracy. During this lamination, the electrical steel sheet 40 receives a certain pressurizing force from the spring 145. When the punching process and the lamination process as described above are sequentially repeated, a predetermined number of electrical steel sheets 40 can be stacked. In addition, the laminate formed by stacking the electrical steel sheets 40 in this manner is heated to, for example, a temperature of 200° C., by the heating device 141 (heating process). According to this heating, the insulation coatings 3 of the adjacent electrical steel sheets 40 are adhered to each other.

Here, the heating device 141 may not be arranged on the outer peripheral punching female mold 142. That is, it may be taken out of the outer peripheral punching female mold 142 before the electrical steel sheet 40 laminated with the outer peripheral punching female mold 142 is adhered. In this case, the outer peripheral punching female mold 142 may not have the heat insulation member 143. In addition, in this case, the stacked electrical steel sheets 40 before adhesion may be sandwiched and held from both sides in the axial direction with a jig (not shown) and then transported and heated.

According to the above processes, the stator core 21 is completed.

The heating temperature in the heating process is, for example, preferably 120 to 220° C., more preferably 130 to 210° C., and still more preferably 140 to 200° C. When the heating temperature is equal to or larger than the lower limit value, the insulation coating 3 is sufficiently cured, and the adhesive strength of the laminated core is further improved. When the heating temperature is equal to or less than the upper limit value, it is possible to reduce deterioration of the insulation coating 3, and it is possible to further relax the stress strain of the electrical steel sheet 40.

When the insulation coating 3 is cured, it is preferable to pressurize the laminate.

The pressure when the laminate is pressurized is, for example, preferably 0.1 to 20 MPa, more preferably 0.2 to 10 MPa, and still more preferably 0.5 to 5 MPa. If the pressure when the laminate is pressurized is equal to or larger than the lower limit value, the insulation coating 3 is sufficiently cured, and the adhesive strength of the laminated core is further improved. If the pressure when the laminate is pressurized is equal to or less than the upper limit value, it is possible to reduce deterioration of the insulation coating 3, and it is possible to further relax the stress strain of the electrical steel sheet 40.

The treatment time when the laminate is heated and pressurized is, for example, preferably 5 to 12 minutes, more preferably 6 to 11 minutes, and still more preferably 7 to 10 minutes. When the treatment time is equal to or larger than the lower limit value, the insulation coating 3 is sufficiently cured, and the adhesive strength of the laminated core is further improved. When the treatment time is equal to or less than the upper limit value, the productivity of the laminated core is further improved.

Here, when inorganic fine particles are not contained, a treatment time of 20 minutes or longer is required, but in the present embodiment, since the coating composition for an electrical steel sheet contains a specific amount of inorganic fine particles, it is possible to produce a laminated core having a sufficient adhesive strength within a treatment time of 12 minutes.

One embodiment of the present invention has been described above. However, the technical scope of the present invention is not limited to the above embodiment, and various modifications can be made without departing from the spirit of the present invention.

For example, the shape of the stator core 21 is not limited to the form shown in the above embodiment. Specifically, the sizes of the outer diameter and the inner diameter of the stator core 21, the lamination thickness, the number of slots, the size ratio between the circumferential direction and the radial direction of the teeth part 23, the size ratio between the teeth part 23 and the core back part 22 in the radial direction, and the like can be arbitrarily designed according to desired properties of the electric motor.

In the rotor 30 in the above embodiment, a pair of permanent magnets 32 form one magnetic pole, but the present invention is not limited to this form. For example, one permanent magnet 32 may form one magnetic pole or three or mom permanent magnets 32 may form one magnetic pole.

In the above embodiment, the permanent magnet field type electric motor has been described as the electric motor 10 as an example, but the structure of the electric motor 10 is not limited to this as exemplified below, and additionally various known structures not exemplified below can also be used.

In the above embodiment, the permanent magnet field type electric motor has been described as the electric motor 10 as an example, but the present invention is not limited thereto. For example, the electric motor 10 may be a reluctance type electric motor or an electromagnet field type electric motor (winding field type electric motor).

In the above embodiment, the synchronous electric motor has been described as the AC electric motor as an example, but the present invention is not limited thereto. For example, the electric motor 10 may be an induction electric motor.

In the above embodiment, the AC electric motor has been described as the electric motor 10 as an example, but the present invention is not limited thereto. For example, the electric motor 10 may be a DC electric motor.

In the above embodiment, the electric motor has been described as the electric motor 10 as an example, but the present invention is not limited thereto. For example, the electric motor 10 may be a generator.

In addition, constituent elements in the above embodiment can be appropriately replaced with well-known constituent elements without departing from the spirit of the present invention, and the above modified examples may be appropriately combined.

EXAMPLES

Hereinafter, the present invention will be described in more detail with reference to examples and comparative examples, but the present invention is not limited to the following examples.

Example 1

A non-oriented electrical steel sheet containing, in mass %, Si: 3.0%, Mn: 0.2%, and Al: 0.5%, with the remainder being Fe and impurities, and having a thickness of 0.25 mm and a width of 100 mm was produced. As the coating composition for an electrical steel sheet, the following epoxy resin composition was used. An electrical steel sheet was obtained by baking and applying the coating composition for an electrical steel sheet at an end-point temperature of 200° C. for 10 seconds so that the thickness of the insulation coating was 3 μm on average.
<Epoxy Resin Composition>
Epoxy resin (bisphenol A type epoxy resin): 100 parts by mass.
High-temperature curing agent (dicyandiamide): 20 parts by mass.
Inorganic fine particles (aluminum hydroxide, volume average particle diameter of 0.5 μm): 30 parts by mass.
<Measurement of Adhesive Strength>
For measurement of the shear adhesive strength, a single sheet having a size of 30 mm×60 mm was cut out and laminated so that a size of 30 mm×10 mm was wrapped. Laminates (samples) were produced at a steel sheet temperature of 200° C. with a pressure of 2 MPa for a treatment time of 4 minutes, 5 minutes, 6 minutes, 7 minutes, and 8 minutes. After these samples were cooled to room temperature (25° C.), the shear adhesive strength was measured, and the numerical value divided by the adhesion area was set as the adhesive strength.

Comparative Example 11

An electrical steel sheet was obtained in the same manner as in Example 1 except that an epoxy resin composition containing no inorganic fine particles was used as the coating composition for an electrical steel sheet.

A single sheet having a size of 30 mm×60 mm was cut out from the obtained electrical steel sheet and laminated so that a size of 30 mm×10 mm was wrapped. A laminate (sample) was produced in the same manner as in Example 1 except that the steel sheet temperature was 200° C., the pressure was 2 MPa, and the treatment time was 12 minutes, 14 minutes, 16 minutes, 18 minutes, 20 minutes, and 22 minutes, and the shear adhesive strength was measured.

Figure 8:
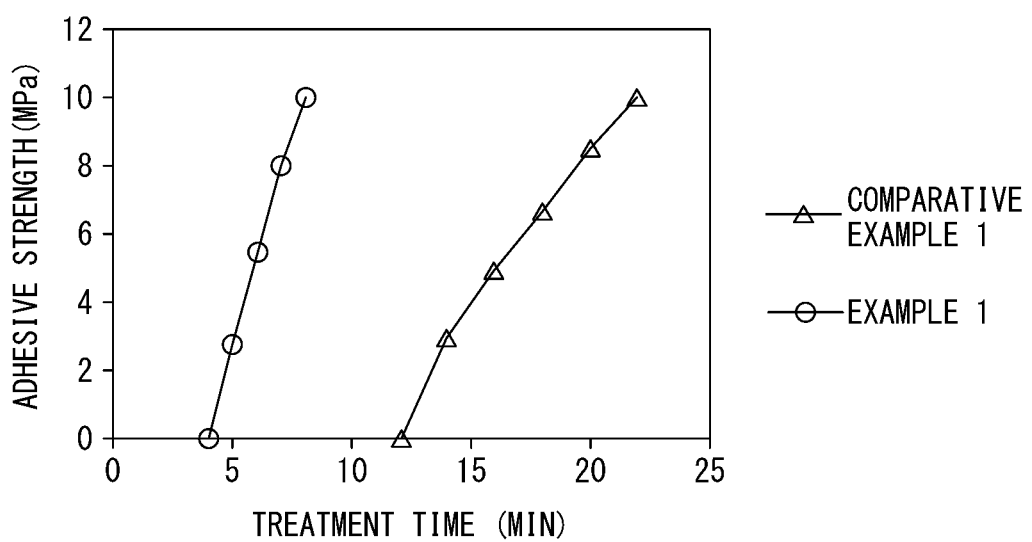
FIG. 8 is an example of a graph showing the correlation between a treatment time and an adhesive strength.

FIG. 8 shows the results of the measured adhesive strengths of Example 1 and Comparative Example 1. FIG. 8 shows the correlation between the treatment time and the adhesive strength due to the difference in the coating composition for an electrical steel sheet. As shown in FIG. 8, in Example 1 in which the present invention was applied, the adhesive strength was 2 MPa or more within a treatment time of 5 minutes, and the adhesive strength was 10 MPa within a treatment time of 8 minutes.

On the other hand, in Comparative Example 1 in which an epoxy resin composition containing no inorganic fine particles was used, a treatment time of 14 minutes was required for the adhesive strength to be 2 MPa or more, and a treatment time of 22 minutes was required for the adhesive strength to be 10 MPa.

Examples 2 to 28 and Comparative Examples 2 to 8

Electrical steel sheets were obtained in the same manner as in Example 1 except that epoxy resin compositions containing inorganic fine particles, high-temperature curing agent s and epoxy resins shown in Tables 1 and 2 were used as the coating composition for an electrical steel sheet. A single sheet having a size of 30 mm×60 mm was cut out from the obtained electrical steel sheet, and laminated so that a size of 30 mm×10 mm was wrapped. A laminate (sample) was produced in the same manner as in Example 1 except that the treatment time was 8 minutes, and the shear adhesive strength was measured. The results are shown in Tables 1 and 2. In Table 1, "-" in the column of inorganic fine particles of Comparative Example 2 indicates that no inorganic fine particles were contained. "-" in the column of the resin other than the epoxy resin in Table 1 and Table 2 indicates that no resin other than the epoxy resin was contained.

TABLE 1

| Inorganic fine particles | | | | Content of epoxy | Resin | High-temperature | Adhesive | |
|---|---|---|---|---|---|---|---|---|
| Type | Amount of additive (*) | Volume average particle diameter (μm) | Epoxy resin | resin with respect to total mass (mass %) | other than epoxy (*) | curing agent/ Amount of additive (*) | strength after 8 minutes (MPa) | |
| None | — | — | Bisphenol A type | 83 | — | Dicyandiamide/20 | 0 | Comparative Example 2 |
| Aluminum hydroxide | <u>0.5</u> | 0.05 | Bisphenol A type | 83 | — | Dicyandiamide/20 | 1 | Comparative Example 3 |
| | 1 | 0.05 | Bisphenol A type | 83 | — | Dicyandiamide/20 | 6 | Example 2 |
| | 5 | 0.05 | Bisphenol A type | 80 | — | Dicyandiamide/20 | 8 | Example 3 |
| | 10 | 0.05 | Bisphenol A type | 77 | — | Dicyandiamide/20 | 10 | Example 4 |
| | 30 | 0.5 | Bisphenol A type | 67 | — | Dicyandiamide/20 | 10 | Example 5 |
| | 50 | 0.5 | Bisphenol A type | 59 | — | Dicyandiamide/20 | 10 | Example 6 |
| | 70 | 0.5 | Bisphenol A type | 53 | — | Dicyandiamide/20 | 8 | Example 7 |
| | 100 | 0.5 | Bisphenol A type | 45 | — | Dicyandiamide/20 | 6 | Example 8 |
| | <u>150</u> | 0.5 | Bisphenol A type | <u>37</u> | — | Dicyandiamide/20 | 2 | Comparative Example 4 |
| | 30 | 0.15 | Bisphenol A type | 67 | — | Dicyandiamide/20 | 15 | Example 9 |
| | 10 | 0.05 | Bisphenol A type | 87 | — | Dicyandiamide/5 | 6 | Example 10 |
| | 10 | 0.05 | Bisphenol A type | 71 | — | Dicyandiamide/30 | 6 | Example 11 |
| | 10 | 0.05 | Bisphenol A type | 61 | Silicone resin/35 | Dicyandiamide/20 | 8 | Example 12 |
| | 130 | 0.5 | Bisphenol A type | <u>40</u> | — | Dicyandiamide/20 | 2 | Comparative Example 5 |
| | 10 | 0.05 | Bisphenol A type | 69 | — | Dicyandiamide/<u>35</u> | 2 | Comparative Example 6 |
| | 10 | 0.05 | Bisphenol A type | 88 | — | Dicyandiamide/<u>3</u> | 2 | Comparative Example 7 |
| Magnesium hydroxide | 30 | 0.05 | Bisphenol A type | 67 | — | Dicyandiamide/20 | 10 | Example: 13 |
| | 30 | 0.2 | Bisphenol A type | 67 | — | Dicyandiamide/20 | 10 | Example 14 |
| | 30 | 1.0 | Bisphenol A type | 67 | — | Dicyandiamide/20 | 10 | Example 15 |
| | 30 | 1.5 | Bisphenol A type | 67 | — | Dicyandiamide/20 | 8 | Example 16 |
| | 30 | 2.0 | Bisphenol A type | 67 | — | Dicyandiamide/20 | 6 | Example 17 |
| | 30 | <u>2.5</u> | Bisphenol A type | 67 | — | Dicyandiamide/20 | 2 | Comparative Example 8 |

Underline indicates that the value is outside of the scope of the invention
* parts by mass with respect to 100 parts by mass of epoxy resin

TABLE 2

| Inorganic fine particles | | | | Content of epoxy resin with respect to total mass (mass %) | High-temperature curing agent/Amount of additive (*) | Adhesive strength after 8 minutes (MPa) | |
|---|---|---|---|---|---|---|---|
| Type | Amount of additive (*) | Volume average particle diameter (μm) | Epoxy resin | | | | |
| Magnesium hydroxide | 50 | 1.0 | Bisphenol A type | 59 | m-Xylylenediamine/20 | 10 | Example 18 |
| Iron hydroxide | 50 | 1.0 | Bisphenol F type | 59 | Phtalic anhydride/20 | 10 | Example 19 |
| Zinc hydroxide | 50 | 1.0 | Phenol novolak type | 59 | Dicyandiamide/20 | 10 | Example 20 |
| Calcium oxide | 50 | 0.5 | Acrylic acid-modified epoxy | 59 | m-Xylylenediamine/20 | 10 | Example 21 |
| Magnesium oxide | 50 | 1.0 | Bisphenol A type | 59 | Phtalic anhydride/20 | 10 | Example 22 |
| Talc | 30 | 1.0 | Bisphenol F type | 67 | Dicyandiamide/20 | 10 | Example 23 |
| Mica | 50 | 0.2 | Phenol novolak type | 59 | m-Xylylenediamine/20 | 10 | Example 24 |
| Kaolin | 70 | 0.5 | Acrylic acid-modified epoxy | 53 | Phtalic anhydride/20 | 10 | Example 25 |
| Montmorillonite | 50 | 1.0 | Bisphenol A type | 59 | Dicyandiamide/20 | 10 | Example 26 |
| Glauconite | 50 | 1.0 | Bisphenol F type | 59 | m-Xylylenediamine/20 | 10 | Example 27 |
| Aluminum hydroxide | 50 | 0.5 | Acrylic acid-modified epoxy | 59 | Triazine-modified phenol novolak resin/20 | 10 | Example 28 |

* parts by mass with respect to 100 parts by mass of epoxy resin

As shown in Tables 1 and 2, in Examples 2 to 28 in which the present invention was applied, the adhesive strength was 6 MPa or more within a treatment time of 8 minutes.

On the other hand, in Comparative Example 2 using the epoxy resin composition containing no inorganic fine particles, the adhesive strength was 0 MPa within a treatment time of 8 minutes. In Comparative Example 3 in which the amount of inorganic fine particles added was outside the scope of the present invention, the adhesive strength was 1 MPa within a treatment time of 8 minutes. In Comparative Example 4 in which the amount of inorganic fine particles added was outside the scope of the present invention, the adhesive strength was 2 MPa within a treatment time of 8 minutes. In Comparative Example 5 in which the content of the epoxy resin was outside the scope of the present invention, the adhesive strength was 2 MPa within a treatment time of 8 minutes. In Comparative Example 6 in which the content of the high-temperature curing agent was outside the scope of the present invention, the adhesive strength was 2 MPa within a treatment time of 8 minutes. In Comparative Example 7 in which the content of the high-temperature curing agent was outside the scope of the present invention, the adhesive strength was 2 MPa within a treatment time of 8 minutes. In Comparative Example 8 in which the volume average particle diameter of inorganic fine particles was outside the scope of the present invention, the adhesive strength was 2 MPa within a treatment time of 8 minutes.

Based on the above results, it was found that, according to the coating composition for an electrical steel sheet of the present invention, it was possible to shorten the treatment time required for producing the laminated core, and it was possible to improve the productivity of the laminated core.

In addition, it was found that, according to the coating composition for an electrical steel sheet of the present invention, it was possible to produce a laminated core having a sufficient adhesive strength even in a short treatment time.

BRIEF DESCRIPTION OF THE REFERENCE SYMBOLS

10 Electric motor
20 Stator
21 Adhesive laminated core for stator
30 Rotor
40 Electrical steel sheet
50 Case
60 Rotating shaft

The invention claimed is:

1. A coating composition for an electrical steel sheet, the coating composition comprising:
   an epoxy resin,
   a high-temperature curing type crosslinking agent, and
   inorganic fine particles,
   wherein a content of the high-temperature curing type crosslinking agent with respect to 100 parts by mass of the epoxy resin is 5 to 30 parts by mass,
   wherein the inorganic fine particles are one or more selected from metal hydroxides, metal oxides that react with water at 25° C. to become metal hydroxides, and silicate minerals having a hydroxyl group,
   wherein a volume average particle size of the inorganic fine particles is 0.05 to 2.0 μm,
   wherein a content of the epoxy resin with respect to a total mass of the coating composition for an electrical steel sheet is 45 mass % or more, and
   wherein a content of the inorganic fine particles with respect to 100 parts by mass of the epoxy resin is 1 to 100 parts by mass.

2. The coating composition for the electrical steel sheet according to claim 1,
   wherein the inorganic fine particles are one or more selected from aluminum hydroxide, calcium hydroxide, magnesium hydroxide, calcium oxide, magnesium oxide, talc, mica, and kaolin.

3. The coating composition for the electrical steel sheet according to claim 1,
   wherein the high-temperature curing type crosslinking agent is one or more selected from aromatic amines, phenolic curing agents, and dicyandiamides.

4. The coating composition for the electrical steel sheet according to claim 2,
   wherein the high-temperature curing type crosslinking agent is one or more selected from aromatic amines, phenolic curing agents, and dicyandiamides.

5. A surface-coated electrical steel sheet for adhesion having an insulation coating obtained by applying the coating composition for an electrical steel sheet according to claim 1 on the surface.

6. A surface-coated electrical steel sheet for adhesion having an insulation coating obtained by applying the coating composition for an electrical steel sheet according to claim 2 on the surface.

7. A surface-coated electrical steel sheet for adhesion having an insulation coating obtained by applying the coating composition for an electrical steel sheet according to claim 3 on the surface.

8. A surface-coated electrical steel sheet for adhesion having an insulation coating obtained by applying the coating composition for an electrical steel sheet according to claim 4 on the surface.

9. A laminated iron core obtained by laminating two or more surface-coated electrical steel sheets for adhesion according to claim 5.

10. A laminated iron core obtained by laminating two or more surface-coated electrical steel sheets for adhesion according to claim 6.

11. A laminated iron core obtained by laminating two or more surface-coated electrical steel sheets for adhesion according to claim 7.

12. A laminated iron core obtained by laminating two or more surface-coated electrical steel sheets for adhesion according to claim 8.

13. The coating composition for the electrical steel sheet according to claim 1,
wherein a content of the epoxy resin with respect to a total mass of the coating composition for an electrical steel sheet is 53 mass % or more and 83% or less.

* * * * *